United States Patent
Cannon, Jr.

(10) Patent No.: US 7,092,913 B2
(45) Date of Patent: Aug. 15, 2006

(54) SYSTEM FOR INEXPENSIVELY EXECUTING ONLINE PURCHASES

(76) Inventor: Thomas Calvin Cannon, Jr., 5165 Phantom Ct., Columbia, MD (US) 21044-1318

( * ) Notice: Subject to any disclaimer, the term of this patent is extended or adjusted under 35 U.S.C. 154(b) by 783 days.

(21) Appl. No.: 10/082,723

(22) Filed: Feb. 26, 2002

(65) Prior Publication Data

US 2003/0163432 A1 Aug. 28, 2003

(51) Int. Cl.
G06Q 99/00 (2006.01)
H04K 1/00 (2006.01)
H04L 9/00 (2006.01)

(52) U.S. Cl. .............. 705/64; 705/26; 705/27; 705/37; 705/35; 705/39; 705/80; 709/219

(58) Field of Classification Search .......... 705/26, 705/27, 33, 35, 37, 39, 53, 64, 67–69, 72, 705/75, 77–79, 80, 400, FOR. 10; 380/24; 902/8, 40; 709/219
See application file for complete search history.

(56) References Cited

U.S. PATENT DOCUMENTS

| 5,220,501 | A | * | 6/1993 | Lawlor et al. | 705/40 |
| 6,202,054 | B1 | * | 3/2001 | Lawlor et al. | 705/42 |
| 6,594,647 | B1 | * | 7/2003 | Randle et al. | 705/77 |
| 2002/0052853 | A1 | * | 5/2002 | Munoz | 705/79 |

FOREIGN PATENT DOCUMENTS

JP 03284574 * 5/1993

OTHER PUBLICATIONS

Bowen, Cathy, Behind the Spree in Payments for C2C Apr. 2000, v13, n1, p28.*

* cited by examiner

*Primary Examiner*—Trammell James
*Assistant Examiner*—Charlie C. L. Agwumezie

(57) ABSTRACT

The present invention is a system for making online purchases using electronic funds transfers from the buyers' bank account to the vendor's bank account, enabled by an intermediate funds transfer from the buyer's account to a holding account maintained by the buyer's bank or a third party. The system is further enabled by the buyer's bank acting as a portal to the Internet that pre-authenticates buyers, enforces security, and speeds the execution of online transactions.

1 Claim, 1 Drawing Sheet

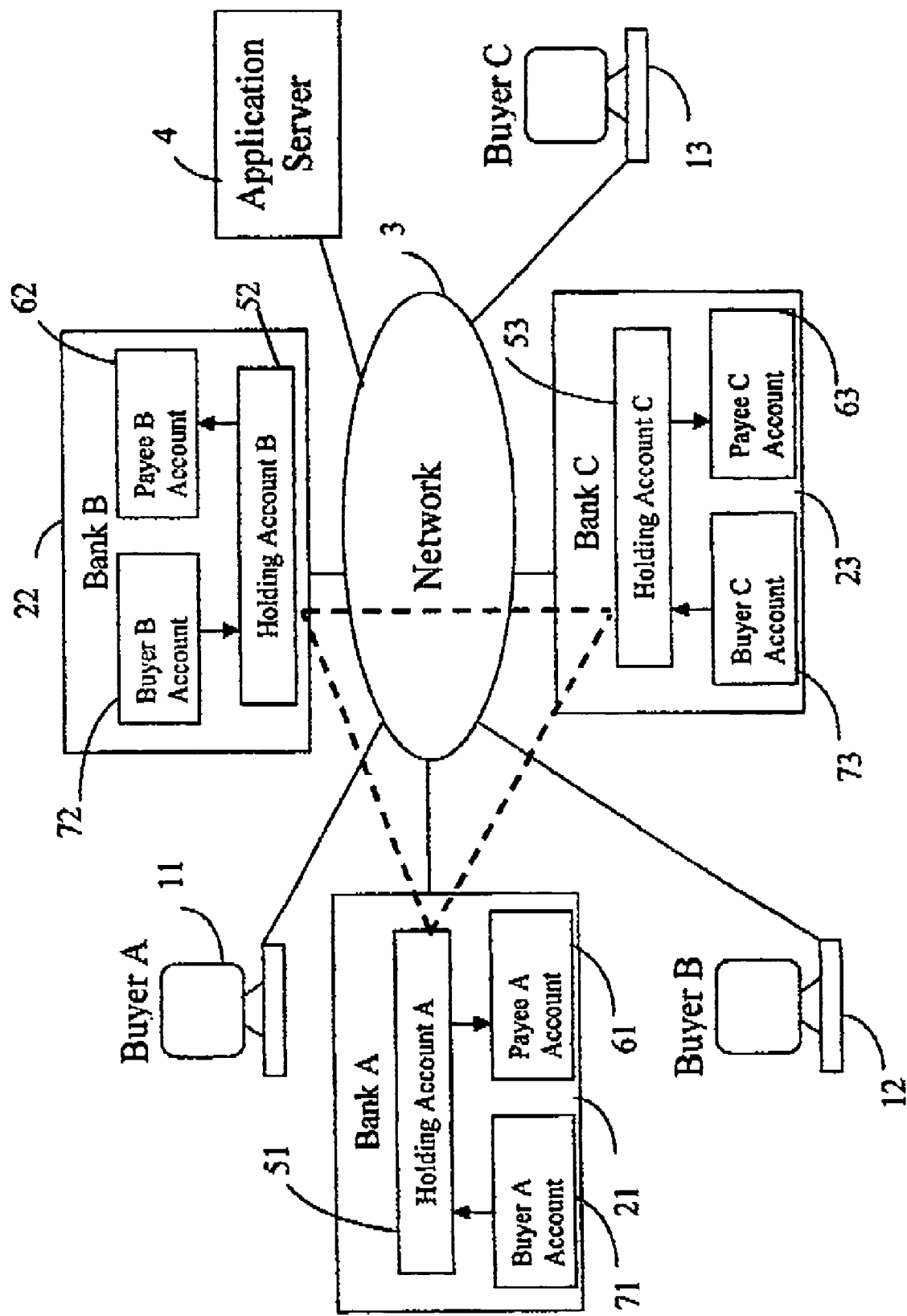

SYSTEM FOR INEXPENSIVELY EXECUTING ONLINE PURCHASES

BACKGROUND OF THE INVENTION

This invention relates to payment of online purchases, and more particularly to a system that executes such payments in a efficient and cost-effective manner so as to make it economical to sell and purchase online products and services priced as low as just a few pennies per item.

The major issues that confront online purchasing systems are fraud, security, execution speed, and transaction costs. The last of these issues, transaction costs, is of particular concern to Internet vendors because of the nature of products typically sold over the Internet, and price expectations of their customers. Many of the products and services provided over the Internet are information-based, with virtually zero incremental cost of goods and small cost of delivery. As such, customers have expectations of low prices for such goods and services. Such expectations, coupled with the cost and inconvenience of executing online transactions have contributed to the commonly used practice of companies giving away software and information for free.

Existing electronic payment methods are either costly, slow to consummate, or both. For example, debit cards typically costs $0.50 per transaction. (Banks also impose dollar limits on the amount that can be debited.) Electronic check payments are only slightly better. Electronic bill payment systems typically charge users around $0.20 per transaction, and can take several days to deliver payment to the Internet-based merchant. "Electronic Cash" systems have been developed to support on-line transactions. However such e-cash systems have yet to be adopted on a broad scale, and their cost-effectiveness when used exclusively for low-value items has yet to be established.

The "free information" model (paid for by advertising) actually works to the disadvantage of Internet users. Since vendors cannot economically collect the small revenue associated with each transaction, there is little financial incentive for small-transaction businesses to emerge on the Internet, thereby limiting the richness of products and resources available to users. Furthermore, many free Web sites that do exist tend to be overloaded, resulting in long waits times, because the Web site owners cannot afford to invest in infrastructure that would improve responsiveness.

A low-cost online purchasing system can stimulate more diversity and competition in Internet-based services. Such products and services might include, for example, drawings, maps, greeting cards, publications, recipes, search services, advice services, sales alerts, stock alerts, whether and traffic alerts, and buying services. Thus a purchasing system that could economically execute transactions of arbitrary size would benefit both customers and vendors, and further stimulate e-commerce.

A new paradigm is also needed for the way financial institutions are reimbursed for supporting the transactions of online vendors. Specifically, instead of charging online vendors on a per-transaction basis, banks may charge online vendors for maintaining accounts. Alternatively, banks may charge online vendors based on the dollar volume of transactions processed by the bank on behalf of the vendor. Still another model is for banks to serve as an Internet portal through which buyers are authenticated for making purchases from online vendors, with banks charging online vendors for access through the portal. This model is analogous to mall operators charging shops in the mall rental space and security fees. It is also clear that some combination of the above models is also a possibility. The present invention supports all of the business models described above.

BRIEF SUMMARY OF THE INVENTION

A system for making online purchases by executing internal electronic funds transfers from the buyers' bank account to the vendor's bank account, enabled by an intermediate funds transfer from the buyer's account to a holding account maintained by the buyer's bank or a third party. The system is further enabled by the buyer's bank acting as a portal to the Internet that pre-authenticates buyers, enforces security, and speeds the execution of online transactions.

BRIEF DESCRIPTION OF THE DRAWINGS

The drawing is a schematic of an exemplary embodiment of a system according to the present invention for making online purchases by executing electronic funds transfers from buyer accounts to payee accounts, enabled by a system of holding accounts, maintained by the banks or a third party.

DETAILED DESCRIPTION OF THE INVENTION

The drawing is a schematic of an online purchasing system according to the present invention. Buyers 11, 12, and 13, banks 21, 22, and 23, and application server 4 are connected by a network 3. Within the scope of the present invention, a network 3, may be replaced by a system of networks interconnecting the various elements of this invention so as to provide greater security or some other benefit to the system. The schematic has been simplified to show just three buyers 11, 12, 13 and three banks 21, 22, 23, but the same system can be extended to support any number of buyers and banks.

Within each bank 21, 22, and 23, resides three types of accounts, buyer accounts 71, 72, and 73, payee accounts 61, 62, and 63, and holding accounts 51, 52, 53. Without loss of generality, only one buyer account and one payee account are shown within each bank for clarity of discussion, although the same system can be implemented to support any number of buyer accounts and payee accounts residing in each bank. In practice each bank will host multiple buyer and payee accounts. For the present invention, the term "operator" refers to an agent that controls movement of funds into and out of a particular account. Buyer accounts 71, 72, and 73 are owned and operated by buyers 11, 12, and 13, respectively. Payee accounts 61, 62, and 63 are owned and operated by online vendors. Holding accounts 51, 52, and 53 are owned and operated by either the banks 21, 22, and 23, respectively in which holding accounts 51, 52, and 53 reside, or a third party. The operator of the holding accounts 51, 52, and 53 is also authorized to move funds out of buyer accounts 71, 72, and 73 and into payee accounts 61, 62, and 63. For the present invention, the term "service bureau" refers to the operator of the holding accounts, whether that operator is a collection of banks or a third party.

For the purposes of the present invention, the term "Internet portal" refers to an application that performs services for buyers that enable either greater access to Web pages or greater functionality for those Web pages visited by buyers. Buyers 11, 12, and 13 initiate the purchasing process by logging onto the application server 4 that serves as an Internet portal for buyers 11, 12, and 13. The application server 4 authenticates each buyer 11, 12, and 13 using authentication systems and routines well known to individuals skilled in the art. For example, the application server 4 may prompt buyers 11, 12, and 13 to enter a private Personal Identification Number or PIN, to validate their identities. Further, the application server 4 assures that only one instance of each buyer 11, 12, and 13 is logged on at any particular time, and that sufficient funds are in each buyer account 71, 72, and 73 to cover purchases as they arise. At the time that they log on, the application server 4 provides buyers 11, 12, and 13 with unique session codes that buyers 11, 12, and 13 use to identify themselves to online vendors for making purchases. The session codes automatically expire when buyers 11, 12, and 13 end their sessions, and after a designated period of inactivity within a session. Once logged on to the application server 4, buyers 11, 12, and 13 may navigate to any Web page on the Internet to the sites of online vendors.

Buyers 11, 12, and 13 initiate purchases by selecting an item on an online vendor's Web site, and sending a payment request to the application server 4 that includes the price of the item, and information, such as a product code, that uniquely identifies the item to be purchased. Since buyers 11, 12, and 13 are logged onto the Internet through the application server 4, the application server knows the identity of buyers 11, 12, and 13, including their email addresses, unique session codes, and buyer accounts 71, 72, and 73. Further, the application server 4 knows the identify of the online vendor and whether it maintains an account at one of the banks 21, 22, 23, served by the system. Prospective buyers 11, 12, and 13 need only give online vendors their unique session codes at the time that they wish to make a purchase.

The application server 4 executes online purchases via a four-step process. First, the application server 4 checks to determine if the online vendor maintains a payee account 61, 62, or 63 with any of the banks 21, 22, and 23 served by the system. If negative, the purchase is denied. If positive, the second step is for the application server 4 to instruct the service bureau to debit the buyer's account 71, 72, or 73 and credit the corresponding holding account 51, 52, or 53 that resides within the same bank 21, 22, or 23 for the amount of the purchase. The debit is only permitted if buyer 11, 12, or 13 has sufficient funds in their corresponding buyer account 71, 72, or 73 at the time of the purchase to cover the purchase. The third step is to transfer funds, in the amount of the purchase, into the payee account 61, 62, or 63 of the online vendor from the particular holding account 51, 52, or 53 that resides within the same bank 21, 22, or 23. In general, a particular buyer 11, 12, or 13 will not maintain a buyer account 71, 72, or 73 at the same bank where the online vendor involved in the transaction maintains his or her account. Thus the holding account 51, 52 or 53 that is credited for a particular purchase may not be the same holding account 51, 52, or 53 from which funds are drawn to pay the online vendor involved in the transaction. Imbalances in holding accounts 51, 52, and 53 that arise because of these type transactions are settled at the end of the transaction day by moving funds between the various holding accounts 51, 52, and 53.

The fourth step is for the application server 4 to notify both the online vendor and buyer 11, 12, or 13 that the purchase has been completed and that funds have been transferred into and out of appropriate accounts. A Web page is pushed to the buyer 11, 12, or 13 notifying them of the purchase. Separately, for security reasons, the buyer 11, 12, or 13, is sent an email message to their email address on record confirming the purchase. The online vendor's purchase confirmation contains the product code, or other information sufficient to identify the item being purchased, the session code of the buyer, and the amount deposited into the online vendor's payee account 61, 62, or 63. The online vendor uses the session code to release the product to the appropriate buyer 11, 12, or 13. This completes the purchase and payment cycle.

Because of the account settlement processes employed by commercial banks, there is no guarantee that fund transfers that were approved earlier in the day will have sufficient funds to cover then at the time of settlement. Settlement usually takes place at night after the close of transactions. During settlement, commercial banks employ a priority system that determines the order in which funds are withdrawn from accounts. It is thus possible for a high-priority withdrawal to occur that draws an account down to a level insufficient to satisfy a lower-priority withdrawal registered earlier in the day. Thus to avoid all transaction risks, online vendors would ordinarily have to wait until the next day to be assured that payments are valid. However, online purchasers typically are only willing to wait a few seconds for payment approvals, especially for low-priced items. A combination of solutions may be employed to address the problem of granting payment approval in near real-time, yet minimizing transaction risks for online vendors. One approach is to require buyers 11, 12, 13 to transfer funds into their respective holding accounts 51, 52, 53 the day prior to making any online purchases. Purchases then may be approved up to the limit of their funds in holding accounts 51, 52, and 53. A disadvantage of this approach is that buyers are denied 11, 12, 13, the use of funds deposited in holding accounts 51, 52, 53 until purchases are made. A second approach is to place a dollar limit on what buyers 11, 12, 13 can purchase in one day, and for the service bureau, online vendors, and respective banks 21, 22, 23 to agree on who covers the costs of transactions that fail at settlement. Some agreements may call for sharing costs between the service bureau, online vendors, and banks 21, 22, and 23. Some combinations of these approaches may also be used as well as others not explicitly identified herein.

The service bureau may cover its operating costs with payments from banks 21, 22, 23, transaction charges from online vendors, or with payments from buyers 11, 12, 13 themselves. Similarly, banks 21, 22, 23 may cover their costs by charges to either buyers 11, 12, 13 or transaction charges to online vendors. Banks may also charge online vendors special fees for hosting payee accounts 61, 62, and 63.

In general, at the end of any given transaction period there will be an imbalance in the funds transferred into and out of each holding account 51, 52, and 53. These various holding 51, 52, 53 must be settled. Since the sum of the imbalances in the various holding accounts 51, 52, 53 will be zero, settlement may be accomplished through a series of external electronic finds transfers (EFT). In general, the number of EFTs required to achieve settlement is equal to one less than the number of holding accounts 51, 52, 53. That is, for an online purchasing system consisting of N distinct holding accounts, then N-1 separate transfers would be sufficient to settle all accounts. A preferred settlement routine consists of first transferring all the excess funds from those holding accounts having excess deposits into the one holding account having the largest deficit. The second and final step is to transfer all of the excess funds from the holding account, that formerly had the largest deficit, into the remaining holding accounts that have deficits, in amounts necessary to exactly balance each remaining holding account. The dashed lines in FIG. 1 shows the virtual paths by which funds are transferred between the various holding accounts 51, 52, 53.

At the end of the transaction day, the application server 4 collects, partitions and formats payment date to be sent to the online vendors. The corresponding payment data is relayed to buyers 11, 12, 13 and their banks 21, 22, 23. Also, at the end of the transaction day, the application server 4 generates a log of transaction files for each online vendor, and delivers this information to the online vendors and their respective banks 21, 22, 23.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What I claim as my invention is:

1. A system for making online purchases comprising;
   a customer interface device for connecting buyers to either a voice or data network,
   a network of banks,
   a collection of buyers each of which maintains a buyer account with at least one of the banks in the network of banks,
   a collection of payees each of which maintains a payee account with at least one of the banks in the network of banks,
   a network of holding accounts with at least one holding account residing in each of the banks in the network of banks,
   an agent that directs the transfer of funds from a buyer account into a holding account residing in the same bank as the buyer account within the network of banks, and also directs the transfer of funds into a payee account from a holding account residing in the same bank as the payee account within the network of banks,
   a means for authenticating buyers and payees and enforcing security.

* * * * *